United States Patent [19]

Ishii et al.

[11] Patent Number: 4,866,463

[45] Date of Patent: Sep. 12, 1989

[54] ELECTRIFIED TRANSFER RECORDING APPARATUS

[75] Inventors: Hiroshi Ishii, Kashihara; Shunji Nakai, Moriguchi; Hiroyuki Sawai, Nara; Tetsuyuki Ueda, Nara; Hiroyuki Hanato, Tenri; Tadashi Iwamatsu, Tenri, all of Japan

[73] Assignee: Sharp Kabushiki Kaisha, Osaka, Japan

[21] Appl. No.: 150,147

[22] Filed: Jan. 29, 1988

[30] Foreign Application Priority Data

Jan. 30, 1987 [JP] Japan .................................. 62-20892

[51] Int. Cl.[4] ............................................. G01D 15/00

[52] U.S. Cl. ..................................... 346/163; 346/151

[58] Field of Search ............. 346/162, 163, 151, 76 R, 346/76 PH; 219/216 PH; 400/120

[56] References Cited

U.S. PATENT DOCUMENTS 4,233,611 11/1980 Nakano et al. ....................... 346/155

*Primary Examiner*—Arthur G. Evans

*Attorney, Agent, or Firm*—Birch, Stewart, Kolasch & Birch

[57] ABSTRACT

An electrified transfer recording apparatus, which is characterized in that a draw-back region is provided for the end part of a printing head to be used for the electrified transfer recording apparatus which drives selectively a plurality of recording electrodes allocated on an insulated base material for the electrified transfer ribbon consisting of a thermal transfer ink and a resistance layer.

3 Claims, 3 Drawing Sheets

ELECTRIFIED TRANSFER RECORDING APPARATUS

BACKGROUND OF THE INVENTION

The present invention relates to an electrified transfer recording apparatus.

An electrified transfer recording apparatus which has been known by the prior art generally has the structure as seen in FIG. 4 of a plurality of recording electrodes 1 selectively driven, a resistance layer 2 in the vicinity of the recording electrodes 1 which is heated and an ink layer 3 from which ink is thermally transferred for recording. A conductive layer is provided between the ink layer 3 and resistance layer 2 as is a feedback electrode 6. As the material of the ink layer 3, a wax system ink and a resin system ink are widely used.

In the prior art system explained above, recording efficiency is lowered with the increase of recording speed and transfer failure occurs even when the recording current is increased up to such a degree as causing the ink ribon to be broken by melting.

SUMMARY OF THE INVENTION

The present invention has been proposed considering such a problem and therefore it is an object of the present invention to provide an electrified transfer recording apparatus which has improved printing quality during high speed recording with a simplified structure.

Briefly described, in accordance with the present invention, an electrified transfer recording apparatus is provided, which selectively drives a plurality of recording electrodes allocated to an insulated base material of recording head. A transfer ribbon consists of thermal transfer ink and a resistance layer. A draw-back allowance is provided for to the end part of the print head.

BRIEF DESCRIPTION OF THE DRAWINGS

The present invention will become more fully understood from the detailed description given hereinbelow and the accompanying drawings which are given by way of illustration, and thus are not limitative of the present invention and wherein.

DETAILED DESCRIPTION OF THE INVENTION

Figure 1:
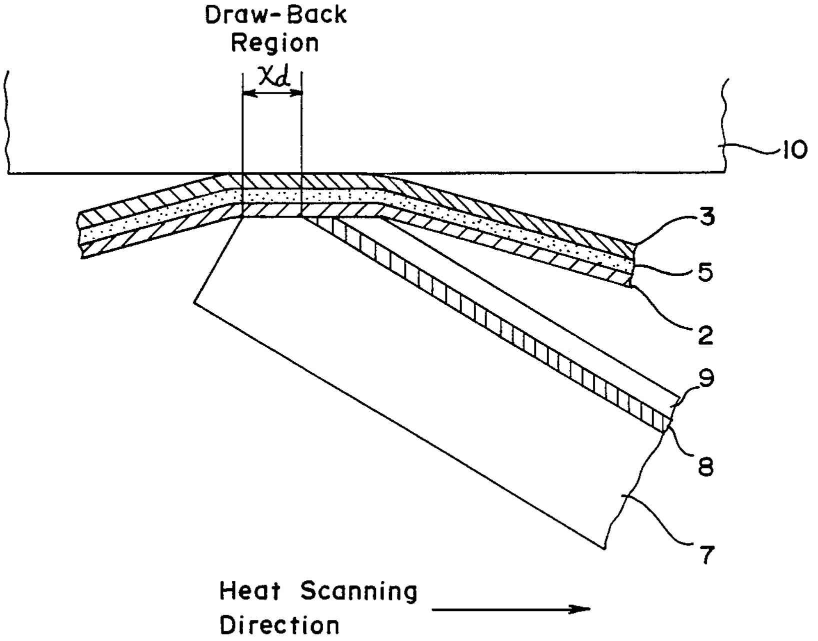
FIG. 1 is a sectional view of the head used in the electrified transfer recording apparatus of the present invention.
Figure 4:
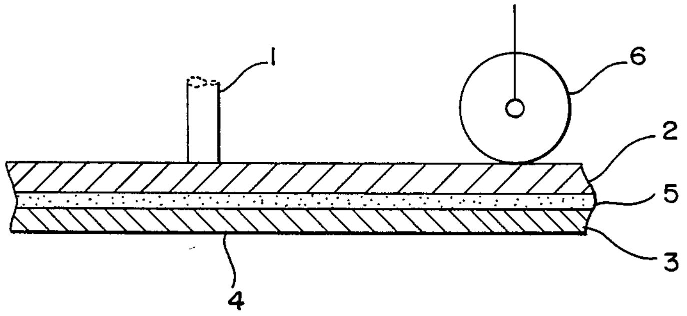
FIG. 4 is a diagram for explaining an electrified transfer recording apparatus of the prior art.

FIG. 1 is a sectional view of the print head used in the electrified transfer recording apparatus of the present invention, wherein a plurality of recording electrodes 8 are formed on an insulated base material 7 by a method such as etching, printing or electro-forming. The recording head is provided with a coat layer 9 for interwire insulation of the recording electrodes 8. The recording head is placed into pressure contact with a recording paper 10 through an ink ribbon consisting of a resistance layer 2, conductive layer 5 and ink layer 3. The end part of the base material 7 of the recording head is chamfered to a predetermined size corresponding to but greater than a draw-back region $x_d$.

In the case of conducting the printing operation with the electrified transfer recording apparatus explained above, the recording head is scanned in the direction of the arrow and the ink ribbon separates from the recording paper 10 after it is pressure contacted with the recording paper 10 for the predetermined period of the draw-back region $x_d$. The ink ribbon and recording paper are pressured together in contact with each other by the print head for a period longer than the delay time for the heat generated at the resistance layer 2 of the ink ribbon to reach, by conductance, the surface of ink layer 3 and finally the recording paper 10, thereby preventing deterioration of the recording quality due to such delay time.

Effect of the draw-back region explained above is explained as follows.

The recording head of FIG. 1 is composed of the insulated base material 7 consisting of inorganic insulation material at a thickness of 1.0 mm, the recording electrodes 8 consisting of a tungsten layer having a pitch of 100 μm and the coat layer 9 consisting of inorganic insulation material at a thickness of about 200 μm. This recording head forms a serial printer having a recording pitch of 100 μm in the scanning direction. Here, Table 1 indicates the result of an experiment for obtaining the range of the draw-back region which assures excellent recording grade at various recording speeds, using the ink ribbon formed by the resistance layer 2 consisting of carbon and polycarbonate at a thickness of 16 μm, an Al conductive layer 5 at a thickness of 1000 Å and resin ink system layer 3 at a thickness of 4 μm. Moreover, the head fitting angle to the recording paper is set to 25 degrees.

TABLE 1

Measuring Result of Adequate Draw-Back Region $X_d$ for Obtaining Excellent Recording Grade

| Recording | Adequate draw-back region $x_d$ [μm] | | Adequate pressurized period $t_d = x_d/(x_p f_p)$ [μs] | |
|---|---|---|---|---|
| $f_p$[pps] | mini | max | mini | max |
| 1.0K [Ton 1 ms] | 0 | 100 | 0 | 1000 |
| 2.0K [Ton 430 μs] | 0 | 200 | 0 | 1000 |
| 3.6K [Ton 200 μs] | 50 | 350 | 139 | 1000 |

Condition: recording pitch $x_p$ 100 μm

As can be determined from Table 1, the draw-back region of 50 μm or more is required for high speed recording, namely for the recording speed of 3.6 Kpps.

Figure 2:
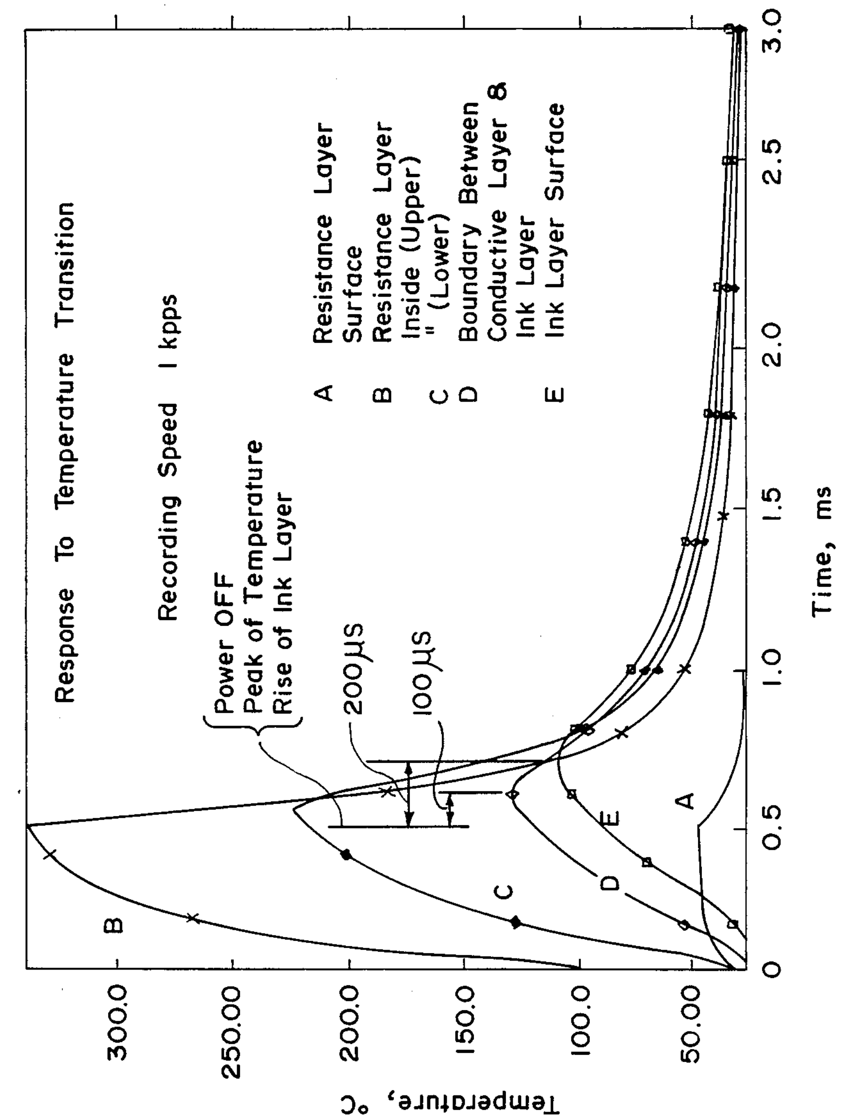
FIGS. 2 and 3 are graphs indicating the results of ribbon temperature simulation.
Figure 3:
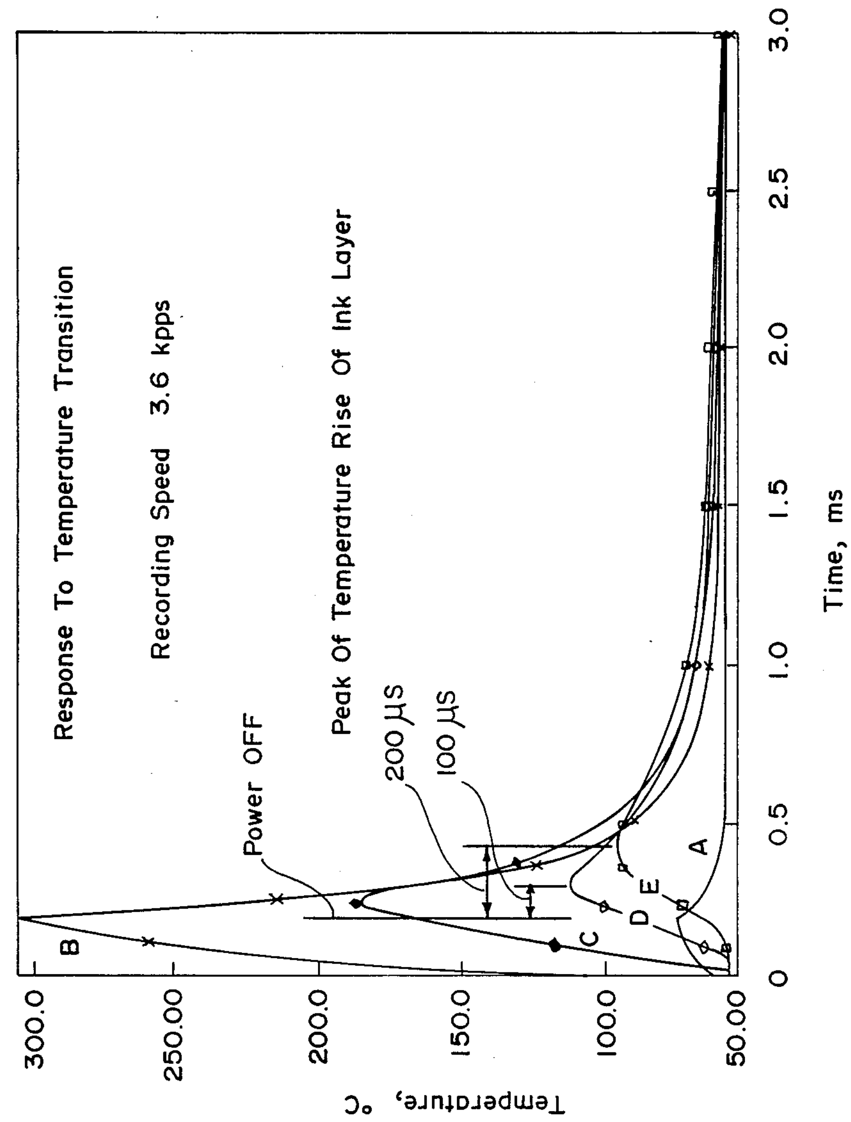

Next, FIG. 2 and FIG. 3 indicates the results of the generated heat transition phenomenon within the ink ribbon simulated by the finite element method under the experimental conditions explained above. As can be understood from both figures, the following simulation results have been obtained for the recording speeds of 1 Kpps and 3.6 Kpps.

(a) A boundary temperature between conductive layer 5 and ink layer 3 becomes the maximum after 100 μs from the end of supply of power.

(b) A boundary temperature between ink layer 3 and recording 10 becomes the maximum after 200 μs from the end of supply of power.

From the above experiment and simulation results, it is desirable that the pressurized contact period $T_d$ set by the draw-back region $x_d$ after the end of printing and the draw-back region $x_d$ are selected in the following relation, considering the recording frequency fp (pps) and recording pitch $X_p$.

$$100\sim200\ \mu s \lesssim T_d \lesssim 1\ ms \quad (1)$$

$$(100\times10^{-6}\sim200\times10-6)f_p\cdot x_p \lesssim x_d \lesssim 10^{-3}\cdot f_p\cdot x_p \quad (2)$$

(the symbol $<$ means that the right side is rather smaller than the left side)

Here, the upper limit values of pressurized contact period $T_d$ and draw-back region $x_d$ exist because a bonding force of ink layer to the conductive layer overcomes that to the recording paper and thereby recording failure is generated if the cooling advances under the pressurized condition after the ink is heated since the resin system ink issued. Moreover, in the experiment result, good result has been obtained when draw-back region $x_d=0$ for 1 Kpps and 2 Kpps, since the pressurized contact period does not become zero (=0) even when $x_d=0$ due to the sink of head for the platen and a little pressurized contact period remains.

In the case of the wax ink system, a problem resulting from over-cooling, which is particular to the resin ink system, is no longer generated. Therefore, the expressions (1) and (2) indicate only the lower limit value, and desirable relations are indicated below.

$$100\sim200\ \mu s < T_d \quad (1')$$

$$(100\times10^{-6}\sim200\times10^{-6})\cdot f_p\cdot x_p \lesssim x_d \quad (2')$$

The same results have also been obtained when the organic insulation material is used for the insulated base material 1.

As explained earlier, the recording efficiency may be improved by providing adequate draw-back region $x_d$ to the head, considering delay of thermal conduction in the electrified transfer recording and good recording can be attained without thermal damage to the ribbon, particularly in high speed recording. The desirable draw-back region ($x_d$) is indicated below, considering material and thickness of ink ribbon and practical range of the head material.

(1) In case the resin ink system is used:

$$100\times10^{-6}\cdot f_p\cdot x_p \lesssim x_d \lesssim 10^{-3}\cdot f_p\cdot x_p$$

(2) In case the wax ink system is used:

$$100\times10^{-6}\cdot f_p\cdot x_p \lesssim x_d$$

While only certain embodiments of the present invention have been described, it will be apparent to those skilled in the art that various changes and modifications may be made therein departing from the spirit and scope of the present invention as claimed.

What is claimed is:

1. An electrified transfer recording apparatus comprising:

a recording head inclusive of a plurality of recording electrodes formed on an insulated base material provided with an insulation layer thereon, and an electrified ink transfer ribbon consisting of a thermal transfer ink layer, a conductive layer and a resistance layer, for transfer of an ink image to a recording paper, said recording head having an end portion thereof, which portion contacts said electrified ink transfer ribbon during image recording, chamferred a predetermined amount greater than a draw-back region ($x_d$) such that when said ink ribbon and recording paper are compressed together by said recording head, said recording paper is maintained in contact with said ink ribbon for a long enough period of time (Td) to allow for a delay in time for heat generated by said recording electrodes at said resistance layer of said ink ribbon to reach the surface of said ink layer, said draw-back region ($x_d$) corresponding to said time delay for transfer of said heat.

2. An electrified transfer recording apparatus according to claim 1, wherein said draw-back region ($x_d$) is set at the following relation when a recording frequency is $f_p$ and recording pitch is $x_p$:

$$100\times10^{-6}\cdot f_p\cdot x_p \lesssim x_d.$$

3. An electrified transfer recording apparatus according to claim 2, wherein said draw-back region is set at the following relation when a thermal transfer resin ink system is used:

$$x_d \lesssim 10^{-3}\cdot f_p\cdot x_p.$$

* * * * *